United States Patent
Maheshwari et al.

(10) Patent No.: US 8,619,577 B2
(45) Date of Patent: Dec. 31, 2013

(54) PROTOCOL DATA UNIT PRIORITY MANAGEMENT

(75) Inventors: Shailesh Maheshwari, San Diego, CA (US); Srividhya Krishnamoorthy, San Diego, CA (US); Thomas Klingenbrunn, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 30 days.

(21) Appl. No.: 13/454,476

(22) Filed: Apr. 24, 2012

(65) Prior Publication Data

US 2012/0207096 A1    Aug. 16, 2012

Related U.S. Application Data

(63) Continuation of application No. 12/121,529, filed on May 15, 2008, now Pat. No. 8,208,378.

(60) Provisional application No. 60/944,434, filed on Jun. 15, 2007.

(51) Int. Cl.
   *H04W 28/00*     (2009.01)

(52) U.S. Cl.
   USPC ........... 370/235; 370/252; 370/312; 709/227; 709/250

(58) Field of Classification Search
   None
   See application file for complete search history.

(56) References Cited

U.S. PATENT DOCUMENTS

| | | | |
|---|---|---|---|
| 5,758,169 A * | 5/1998 | Nizar et al. | 710/266 |
| 5,768,169 A | 6/1998 | Sharangpani | |
| 6,973,094 B1 | 12/2005 | Holloway et al. | |
| 7,522,633 B2 * | 4/2009 | Ichino | 370/466 |
| 8,208,378 B2 * | 6/2012 | Maheshwari et al. | 370/235 |
| 2002/0126675 A1 | 9/2002 | Yoshimura et al. | |
| 2002/0150091 A1 | 10/2002 | Lopponen et al. | |
| 2003/0079023 A1 * | 4/2003 | Stefansson et al. | 709/227 |
| 2007/0071031 A1 | 3/2007 | Shin et al. | |
| 2009/0288125 A1 * | 11/2009 | Morioka | 725/110 |

FOREIGN PATENT DOCUMENTS

| | | |
|---|---|---|
| EP | 1209862 A1 | 5/2002 |
| EP | 1231745 A2 | 8/2002 |
| JP | 2002271366 A | 9/2002 |
| RU | 2282943 C2 | 8/2006 |
| RU | 2295841 C2 | 3/2007 |
| WO | 0223760 A1 | 3/2002 |
| WO | 02085051 A1 | 10/2002 |
| WO | 2005034418 | 4/2005 |

* cited by examiner

*Primary Examiner* — Chi Pham
*Assistant Examiner* — Shick Hom
(74) *Attorney, Agent, or Firm* — Donald C. Kordich

(57) ABSTRACT

A single receiver can collect multiple protocol data units at one time originating from different sources. While it can be desirable for higher priority protocol data units to be processed, loss of data unit portions can cause confusion to the receiver. Therefore, even if a higher priority protocol data unit transfers to the receiver while a lower priority data unit is being processed, the lower priority unit can be completed before processing the higher priority unit; thus, there can be a lower likelihood of confusion among protocol data units.

32 Claims, 14 Drawing Sheets

PROTOCOL DATA UNIT PRIORITY MANAGEMENT

CLAIM OF PRIORITY UNDER 35 U.S.C. §120

This application is a Continuation of U.S. patent application Ser. No. 12/121,529, filed May 15, 2008, which claims the benefit of U.S. Provisional Application No. 60/944,434, filed Jun. 15, 2007, each of which are hereby incorporated by reference in their respective entireties.

BACKGROUND

I. Field

The following description relates generally to wireless communications and, more particularly, to communication of protocol data units.

II. Background

Wireless communication systems are widely deployed to provide various types of communication content such as, for example, voice, data, and so on. Typical wireless communication systems can be multiple-access systems capable of supporting communication with multiple users by sharing available system resources (e.g., bandwidth, transmit power, . . . ). Examples of such multiple-access systems can include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and received antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region. However, conventional techniques can provide limited or no feedback related to channel information.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with a method for managing protocol data unit communication. The method can comprise identifying a start of transfer for an initial protocol data unit. The method can also comprise denying transfer of at least one subsequent protocol data unit until collection of an end portion for the initial protocol data unit.

Another aspect relates to a wireless communication apparatus that can include an establisher that identifies a start of transfer for an initial protocol data unit. The apparatus can also include a regulator that denies transfer of at least one subsequent protocol data unit until collection of an end portion for the initial protocol data unit.

In a further aspect, a wireless communications apparatus can comprise means for identifying a start of transfer for an initial protocol data unit. Moreover, the apparatus can also comprise means for denying transfer of at least one subsequent protocol data unit until collection of an end portion for the initial protocol data unit.

Yet another aspect relates to a machine-readable medium having stored thereon machine-executable instructions for identifying a start of transfer for an initial protocol data unit as well as denying transfer of at least one subsequent protocol data unit until collection of an end portion for the initial protocol data unit.

Still another aspect relates to an apparatus in a wireless communication system that includes a processor configured to identify a start of transfer for an initial protocol data unit and deny transfer of at least one subsequent protocol data unit until collection of an end portion for the initial protocol data unit.

According to an aspect, a method that facilitates a method for managing protocol data unit communication. The method can include identifying that an initial protocol data unit is transmitted. The method can also include suppressing transmission of a subsequent protocol data unit until completion of transmission of the initial protocol data unit.

Another aspect relates to a wireless communication apparatus that can comprise a designator that identifies that an initial protocol data unit is transmitted as well as a holder that suppresses transmission of a subsequent protocol data unit until completion of transmission of the initial protocol data unit.

Yet another aspect relates to a wireless communication apparatus that comprises means for identifying that an initial protocol data unit is transmitted. The apparatus can also comprise means for suppressing transmission of a subsequent protocol data unit until completion of transmission of the initial protocol data unit.

Still another aspect relates to a machine-readable medium having stored thereon machine-executable instructions for identifying that an initial protocol data unit is transmitted and suppressing transmission of a subsequent protocol data unit until completion of transmission of the initial protocol data unit.

In a further aspect, a wireless communication system, an apparatus comprising a processor configured to identify that an initial protocol data unit is transmitted and suppress transmission of a subsequent protocol data unit until completion of transmission of the initial protocol data unit.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
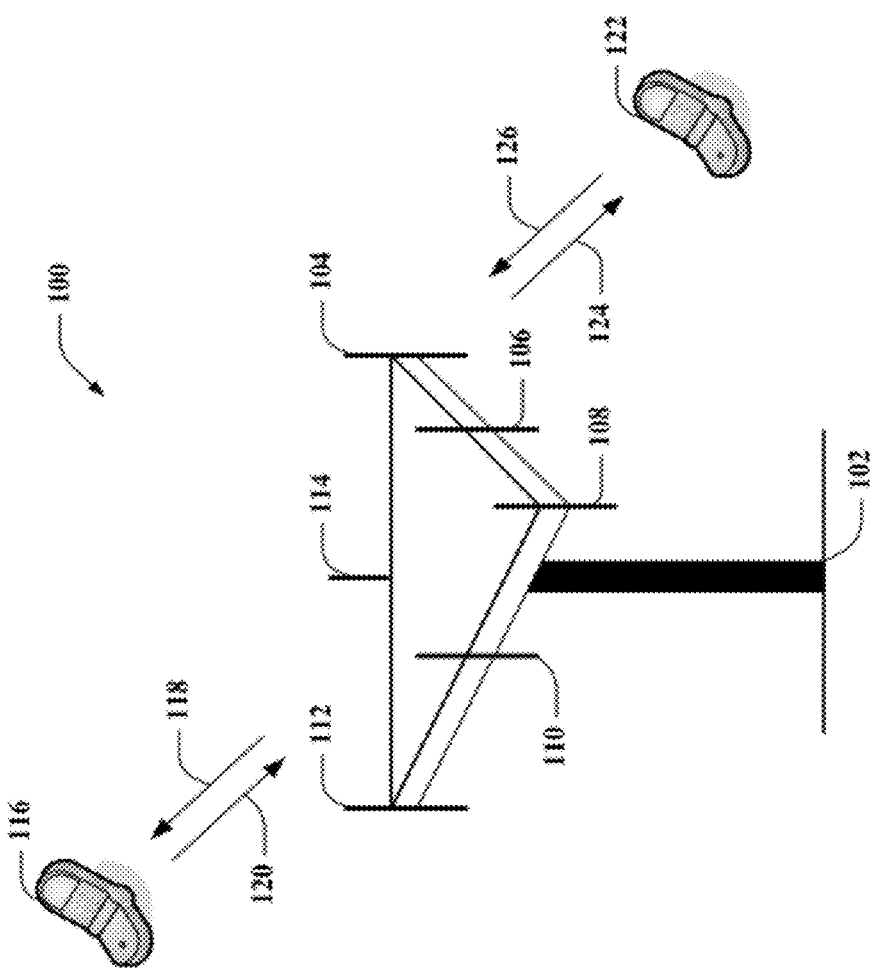
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It can be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device (s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

The set of antennas and/or the area in which they are designated to communicate can be referred to as a sector of base station 102. For example, multiple antennas can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

Figure 2:
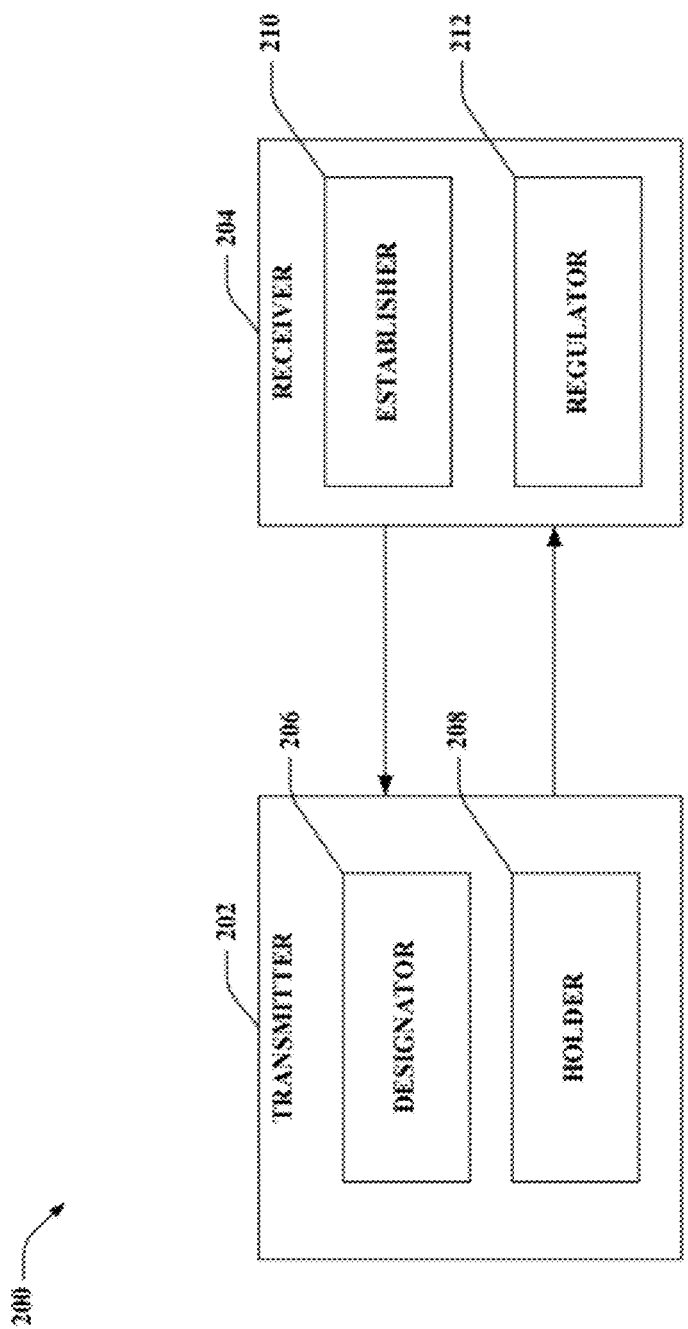
FIG. 2 is an illustration of a representative system for communication of protocol data units of varying priority in accordance with various aspects set forth herein.

Now referring to FIG. 2, an example system 200 is disclosed for communicating protocol data units (PDUs). Conventionally, multiples transmitters (e.g., a transmitter 202) transfer PDUs to a receiver (e.g., a receiver 204). Sometimes, the PDUs are too large for an available bandwidth, so the PDUs are divided into portions that are more manageable. In an illustrative example, a lower priority PDU can transfer to the receiver 204 in multiple portions (e.g., partial PDUs). If a higher priority PDU transfers to the receiver, then the lower priority PDU transfer can be halted and the higher priority PDU transfer can commence. Typically, only a start portion includes information on how to reconstruct the PDU portions back together (e.g., header information. However, PDU portions can be lost during transmission and the receiver 204 can become confused and accidently intermingle PDUs. For instance, if a start indicator portion of the higher priority PDU becomes lost, then the receiver 204 can process subsequent higher priority PDU portions as if they are from the lower priority PDU since the receiver 204 is not notified of a new start and is not instructed on how to construct the higher priority PDU.

To assist in preventing confusion, the receiver 204 can configure such that a PDU that is being processed is completed before allowing another PDU to be processed, even if another PDU is of a higher priority. Additionally, the transmitter 202 can limit a number of PDUs sent and prioritize PDUs to facilitate efficient communication. The transmitter 202 can send out a PDU and a designator 206 can identify that an initial PDU is transmitted. This can be done thought active monitoring of the transmitter 202, collecting a message, and the like. The transmitter 202 can also use a holder 208 that suppresses transmission of a subsequent PDU until completion of transmission of the initial PDU. For example, the holder 208 can regulate an antenna of the transmitter 202 to stop other PDUs from being sent.

The PDU can transfer to the receiver 204 and an acknowledgement message can be sent back to the transmitter 202. An establisher 210 can identify that a start of transfer for an initial PDU at hand. With transfer of the initial PDU, a regulator 212 can deny transfer of at least one subsequent PDU until collection of an end portion for the initial PDU. Denying transfer can include instructing a sending unit that the PDU is not to be accepted at a time, place the subsequent PDU in temporary storage, and the like. According to one embodiment, denying transfer of at least one subsequent protocol data unit until collection of an end portion for the initial protocol data unit occurs when ownership of the initial protocol data unit cannot be inferred except from a header of the initial protocol data unit; without proper ownership it can be difficult or impossible to reconstruct the initial protocol data unit.

Figure 3:
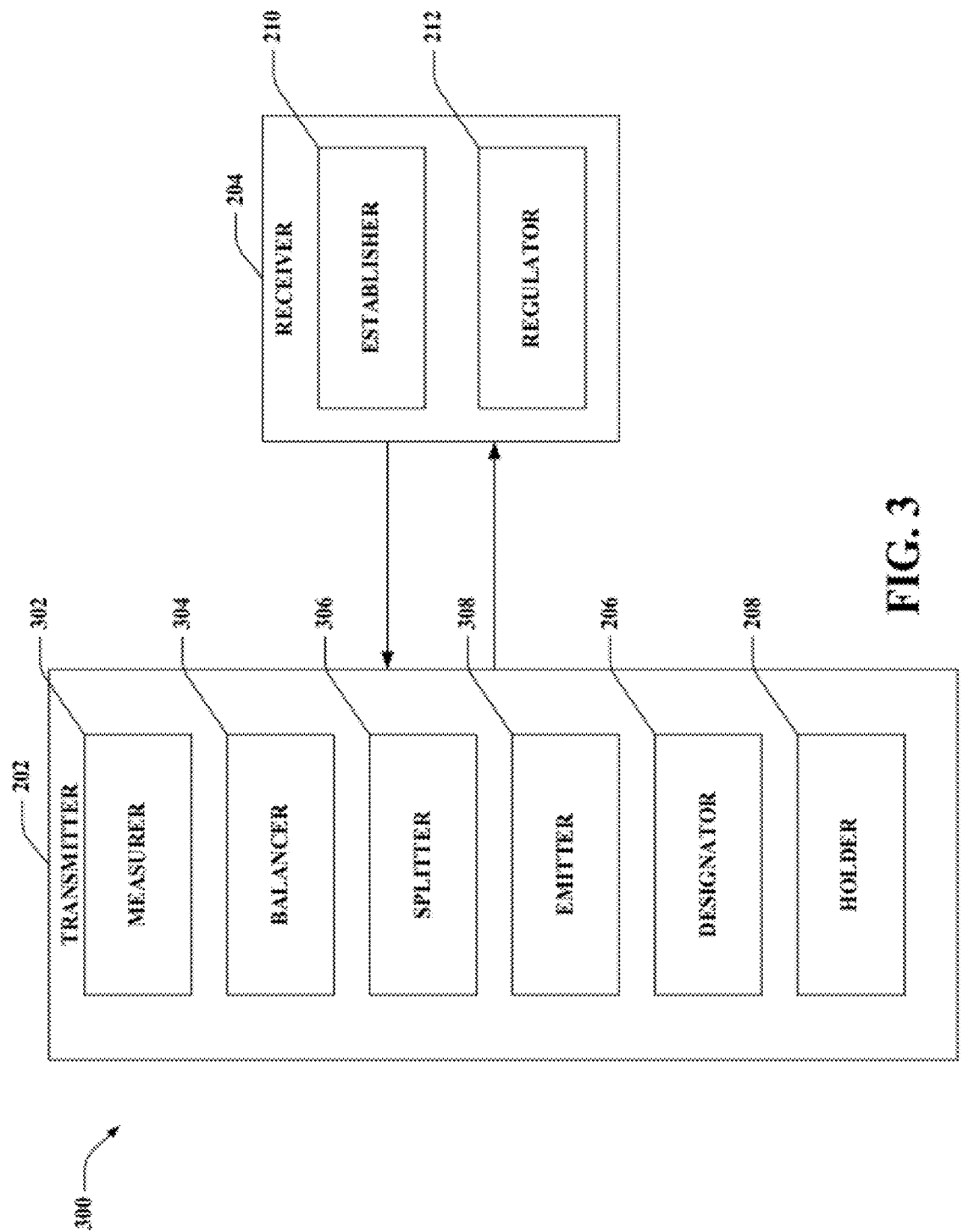
FIG. 3 is an illustration of a representative system for communication of protocol data units of varying priority with a detailed transmitter in accordance with various aspects set forth herein.

Now referring to FIG. 3, an example system 300 is disclosed for managing communication of PDUs with an example detailed transmitter 202. Commonly, communication of information including PDUs is limited by an amount of available bandwidth. Therefore, a measurer 302 can determine a bandwidth size of a communication cannel that is used in communication of the PDU. Additionally, a balancer 304 can determine if a size of the initial PDU is larger than the determined bandwidth.

If the PDU is small enough to fit within an available bandwidth, then the transmitter 202 can send out the PDU in its entirety. However, there can be instances where a PDU is too large for a channel and a splitter 306 can divide the initial PDU into at least two portions, the at least two portions can fit within the bandwidth. Division can occur logically (e.g., broken into associated groups that can fit within the bandwidth), mathematically (e.g., division occurs every X number of bytes), and the like.

An emitter 308 can transmit the initial PDU portions in sequential order and a designator 206 can identify the transmission. Upon recognition, a holder 208 can instruct the transmitter not to send another PDU until the initial PDU transmission is completed. This can allow the transmitter 202 to not overburden the receiver 204 and thus not waste resources of the system 300. The receiver 204 can collect the first portion, identify a start of a transmission through use of an establisher 210, and instruct a regulator 212 to deny other PDUs until collection is complete.

Figure 4:
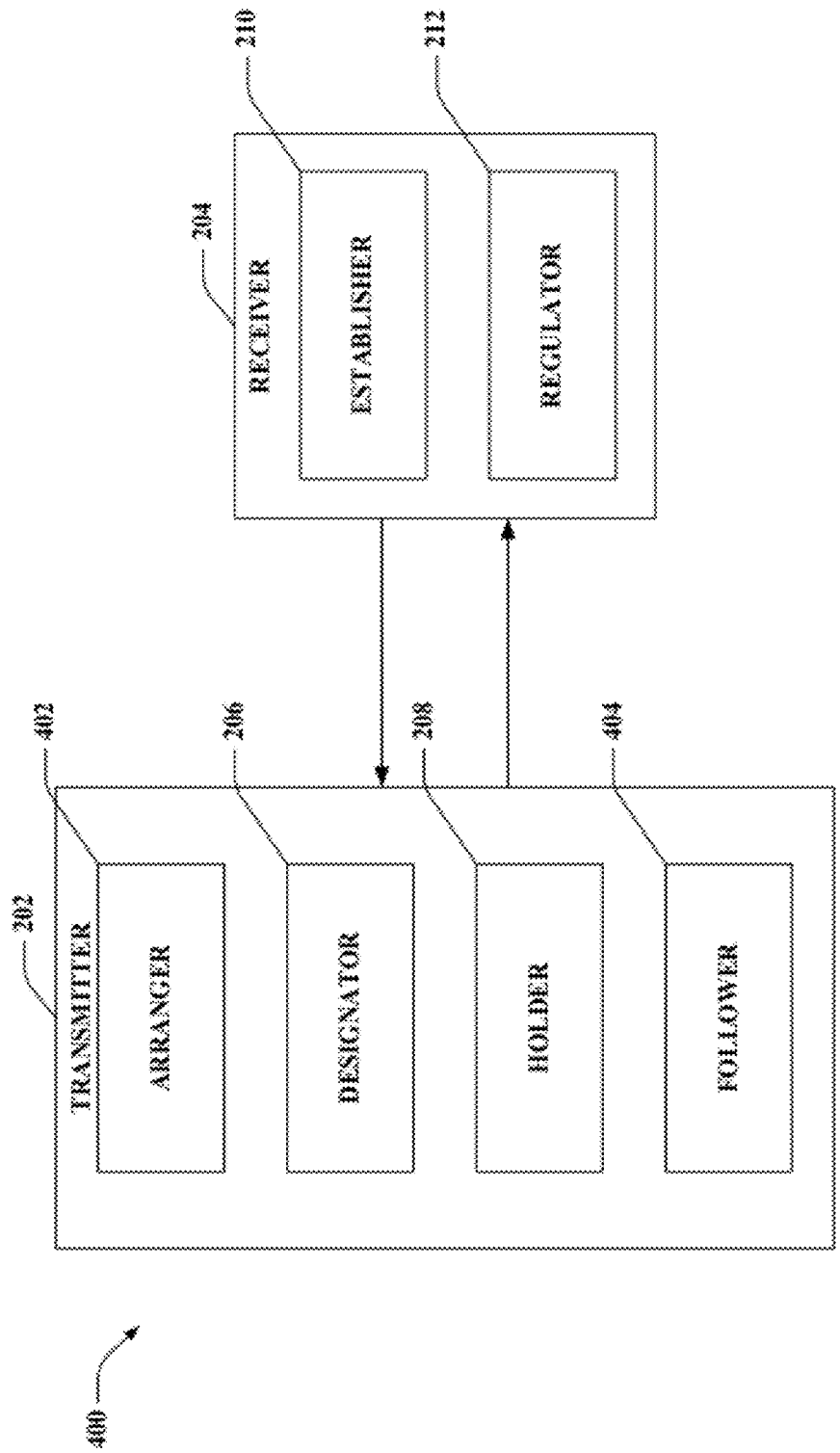
FIG. 4 is an illustration of a representative system for communication of protocol data units of varying priority with a detailed transmitter in accordance with various aspects set forth herein.

Now referring to FIG. 4, an example system 400 is disclosed for managing communication of PDUs with an example detailed transmitter 202. Since when an initial PDU is transmitted other PDUs are not transmitted until completion of the initial PDU, it can be beneficial to place PDUs in an order of priority for transmission. An arranger 402 can order at least two PDUs as a function of priority, the initial PDU is of higher priority than the subsequent PDU—thus, PDUs can be transmitted in an order of priority. After an order is created, the arranger 402 can modify the order as new PDUs are determined to be transferred.

The transmitter 202 can emit the initial PDU and a holder 208 can suppress other PDU transmissions. A follower 404 can observe operation of the transmitter 202 and determine completion of transmission of the initial PDU. Once completion is determined, another PDU on the order created by the arranger 402 can be transmitted to a receiver 204. The receiver 204 can obtain various portions of the initial PDU (as well as subsequent PDUs), identify a start of a transmission through use of an establisher 210, and instruct a regulator 212 to deny other PDUs until collection is complete.

Figure 5:
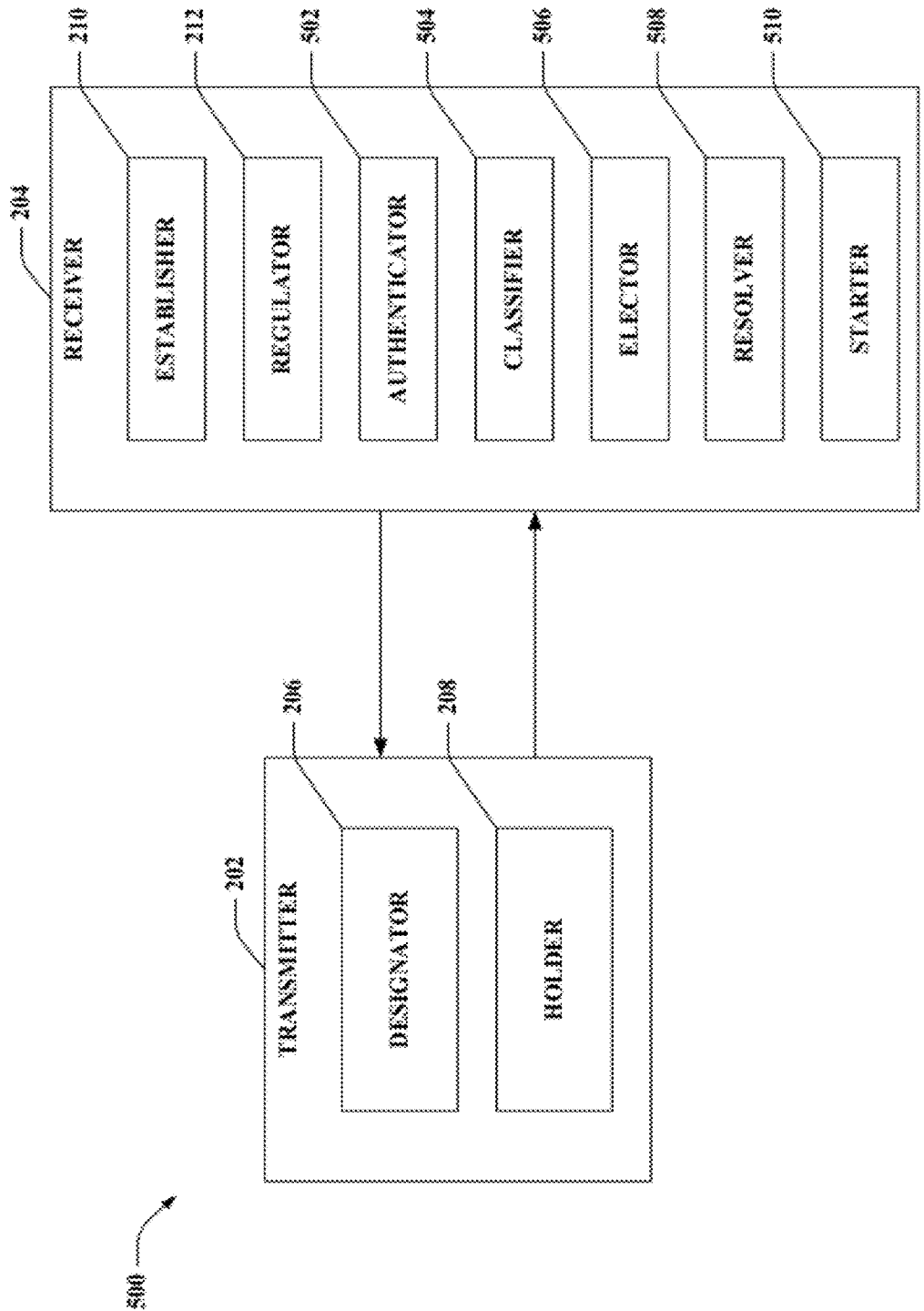
FIG. 5 is an illustration of a representative system for communication of protocol data units of varying priority with a detailed receiver in accordance with various aspects set forth herein

Now referring to FIG. 5, an example system 500 is disclosed for processing multiple PDUs. Multiple transmitters, such as a transmitter 202, can emit PDUs to a receiver 204, where the receiver 204 attempts to process the PDUs. In order to assist the receiver 204, the transmitter 202 can limit a number of PDUs sent. For instance, a designator 206 can determine that an initial PDU is transferred and a holder 208 can suppress other PDUs from being transferred from the transmitter 202 until the initial PDU transmission is finished (e.g., final portion transferred, error identified, and the like).

The receiver 204 can identify a new PDU and use an establisher 210 to identify a start of transfer for an initial PDU. Once transfer of the new PDU commences, a regulator 212 can deny transfer of at least one subsequent PDU until collection of an end portion for the initial PDU. According to one embodiment, the subsequent PDU is of a higher priority level than the initial PDU.

A check can take place by an authenticator 502 that recognizes an end portion for the initial PDU. It is possible that multiple PDUs attempt to be processed the receiver 204. A classifier 504 can be used that categorizes a priority level of at least one subsequent PDU. Based upon the categorization, an elector 506 can select a categorized subsequent PDU to transfer upon recognizing the end of transfer for the initial PDU. Thus, selection of the subsequent PDU can be a function of priority level of the subsequent PDU.

However, it is possible that an elector 506 cannot make a selection because there are multiple PDUs of equal priority. In this case, a resolver 508 can be used that rectifies the subsequent PDU to transfer after the end of transfer for the initial PDU from a group of subsequent PDUs, the group of subsequent PDUs have about equal priority levels. After rectifying ambiguity of about equal priority levels, the elector 506 can make an appropriate selection and a starter 510 that initializes transfer of the subsequent PDU.

Figure 6:
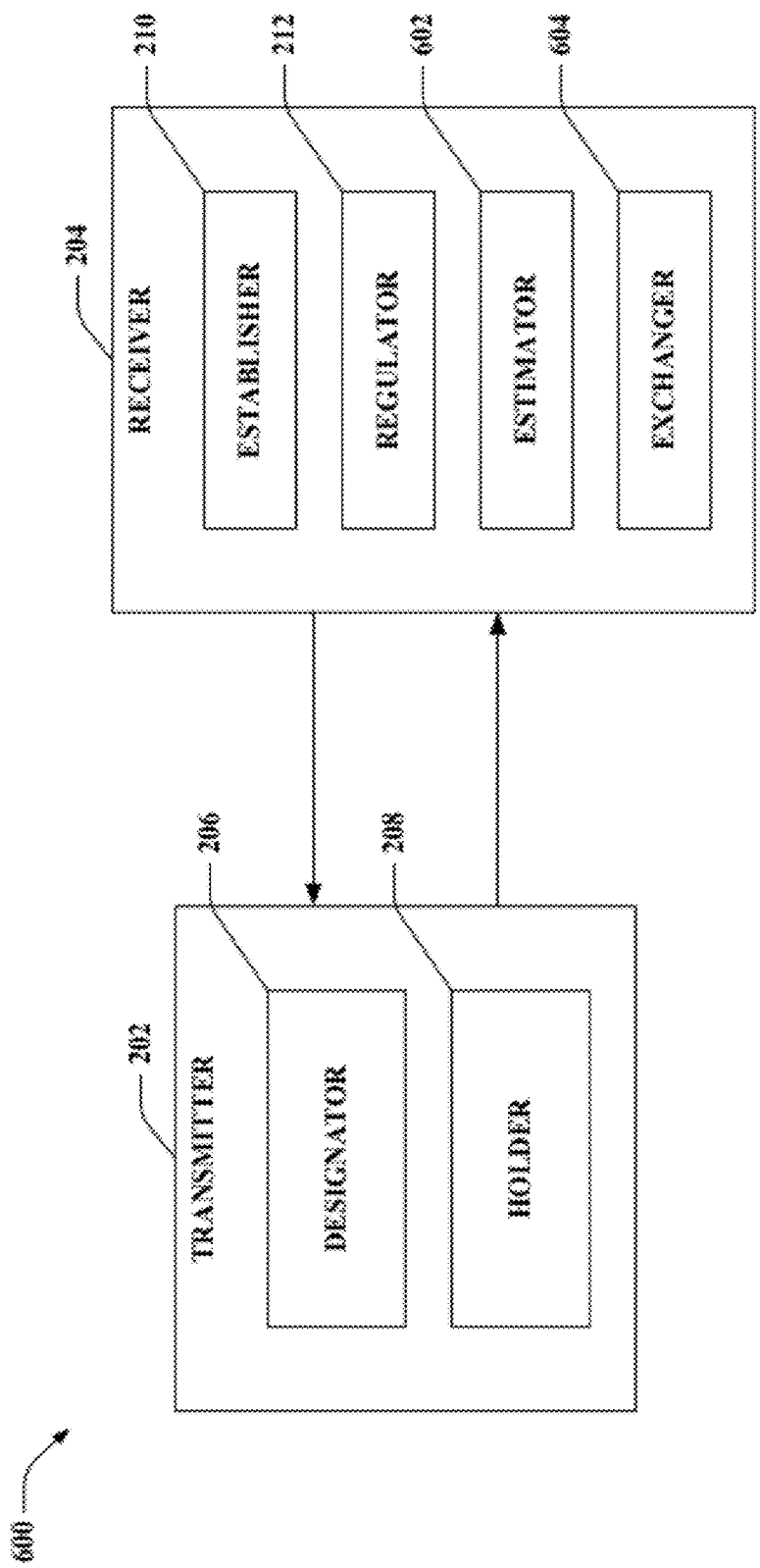
FIG. 6 is an illustration of a representative system for communication of protocol data units of varying priority with a detailed receiver in accordance with various aspects set forth herein.

Now referring to FIG. 6, an example system 600 is disclosed for regulating PDU communication. A transmitter 202 can attempt to send at least one PDU to a receiver 204. Commonly, PDUs are transferred as a continuous stream of data to the receiver 204 in order to lower congestion. A designator 206 can be employed to identify when a transfer of a PDU occurs and a holder 208 can be used to ensure other PDUs do not transmit until appropriate resources are free.

A receiver 204 can use an establisher 210 that identifies a start of transfer for an initial PDU. With the identified start, a regulator 212 can deny transfer of at least one subsequent PDU until collection of an end portion for the initial PDU. It is possible that the receiver 202 never obtains an end portion of the initial PDU. As opposed to being in a perpetual state of waiting, after a set standard is met, an estimator 602 can assume that an end portion is lost and initializes transfer of a subsequent PDU. According to one embodiment, the assumption is based upon time analysis, artificial intelligence techniques, a supplemental communication (e.g., the transmitter 202 requests a conformation of final receipt, but no end PDU portion is collected), or a combination thereof.

Artificial intelligence techniques can employ one of numerous methodologies for learning from data and then drawing inferences and/or making determinations related to dynamically storing information across multiple storage units (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. In addition, these techniques can also include methods for capture of logical relationships such as theorem provers or more heuristic rule-based expert systems. The artificial intelligence techniques can be used to perform determinations disclosed herein. The receiver 204 can use an exchanger 604 that can engage in communication with a device that sends the subsequent PDU, the engaged communication informs the device on status of the subsequent PDU.

Figure 7:
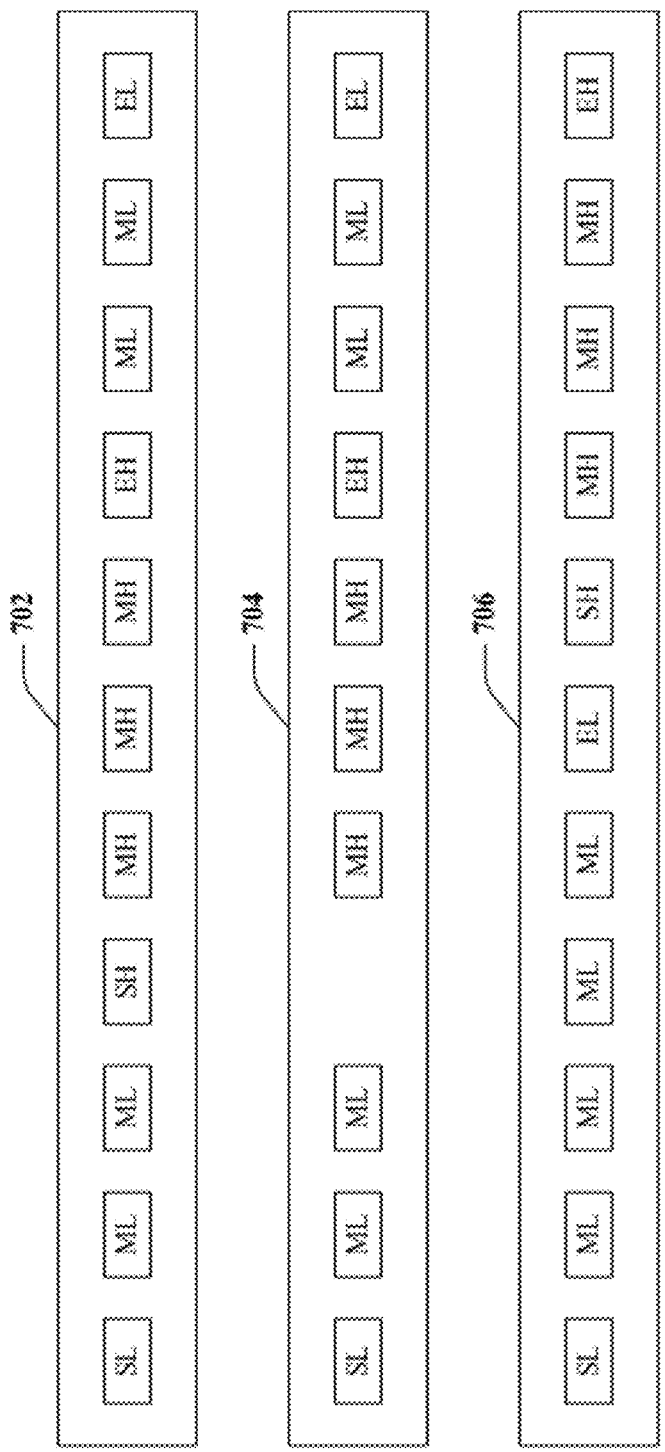
FIG. 7 is an illustration of packet communication in accordance with various aspects set forth herein.

Now referring to FIG. 7, example communication streams 702, 704 and 706 are disclosed. The stream 702 can be what is transferred by a transmitter or multiple transmitters (e.g., transmitter 202 of FIG. 2). It is possible for portions of the stream to become lost and thus the stream 704 can be what is collected by a receiver (e.g., receiver 204 of FIG. 2). The stream 702 can include a start portion of a low priority PDU (SL), a middle portion of a low priority PDU (ML), as well as an end portion of a low priority PDU (EL). Likewise, the stream 702 can include a start portion of a high priority PDU (SH), a middle portion of a high priority PDU (MH), as well as a end portion of a high priority PDU (EH).

If the SH portion is lost, then the receiver can become confused as to what portion belongs to what PDU. For instance, the stream 704 shows a sequence of SL-ML-ML-MH, where SH becomes lost in transmission. Without the SH portion, the receiver likely can believe that the MH of the sequence can actually be a ML. Practicing aspects disclosed herein can lead to stream 706, which organizes PDU portions together, where high priority portions are not processed (e.g., placed in the stream) until completion of the low priority portions.

Figure 8:
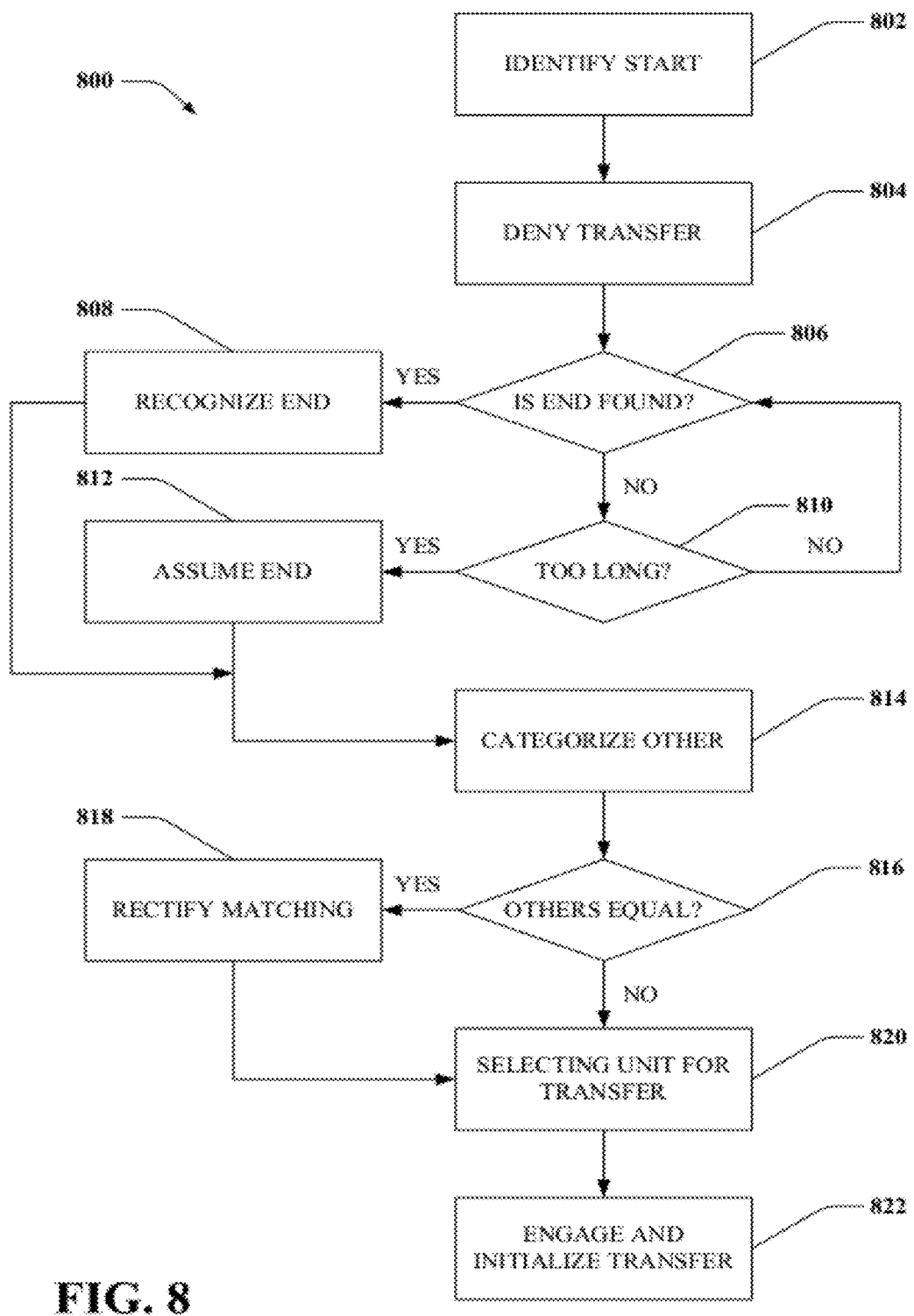
FIG. 8 is an illustration of a representative methodology for processing multiple protocol data units in accordance with various aspects set forth herein.
Figure 9:
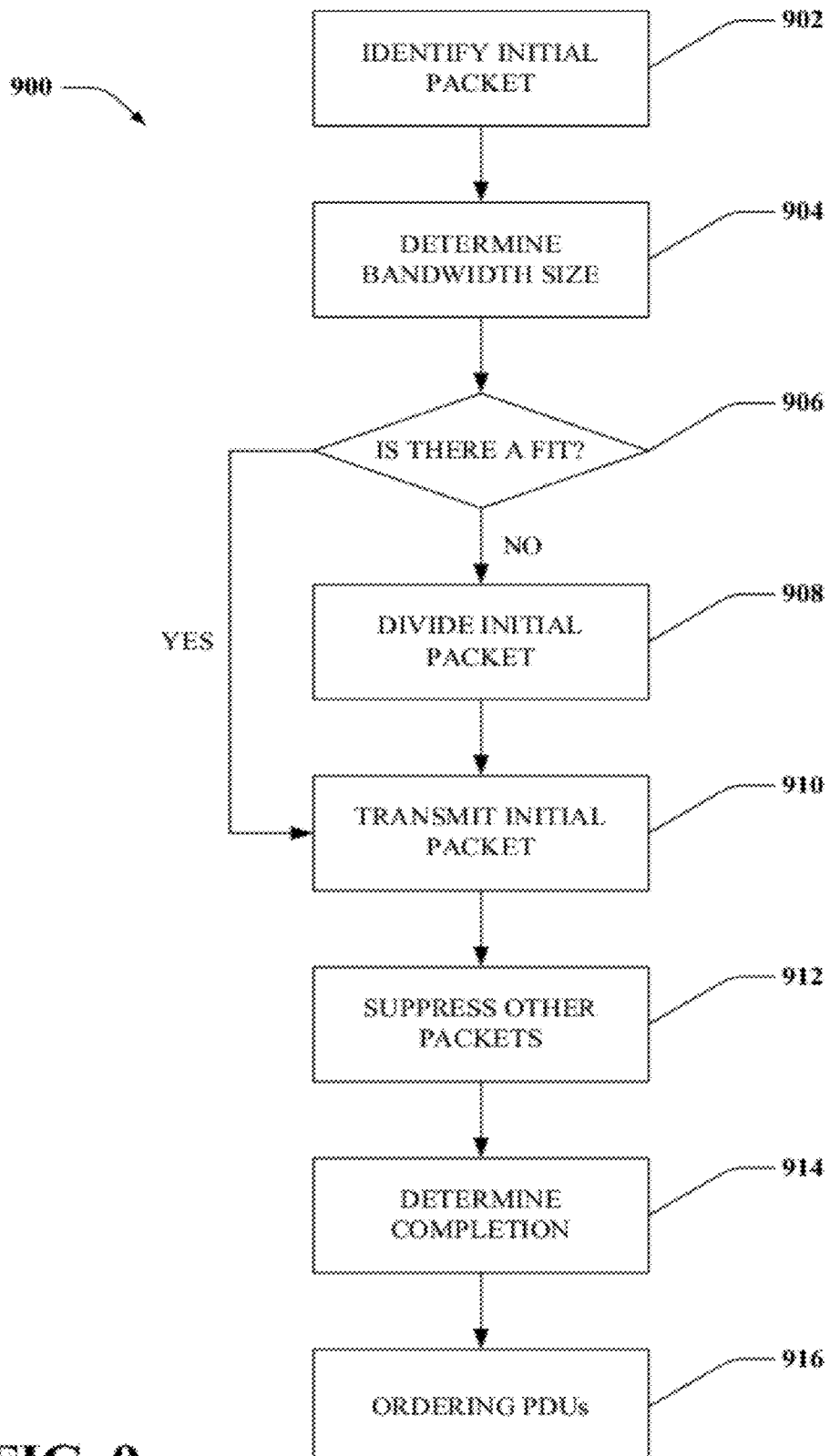
FIG. 9 is an illustration of a representative methodology for transferring a protocol data unit in accordance with various aspects set forth herein.

Referring to FIGS. 8-9, methodologies relating to a PDU communication configuration are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

Now referring to FIG. 8, an example methodology 800 is disclosed for processing multiple PDUs. At block 802, there can be identifying a start of transfer for an initial PDU, commonly performed through reading a PDU portion that contains identification information. When a start of transmission of the initial PDU begins, there can be denying transfer of at least one subsequent PDU until collection of an end portion for the initial PDU at event 804. Collection of the end portion can include successfully receiving an end portion, learning of an assumption that an end unit is sent but not received, and the like. According to one embodiment, the subsequent PDU is of a higher priority level than the initial PDU.

A check 806 can occur to determine if an end portion to the initial PDU is received. If an end portion is received, then recognizing an end portion for the initial PDU takes place at action 808. However, if an end is not recognized then another check 810 can occur to determine if enough time has passed to assume an end portion is lost. Since PDU portions can be lost, it is possible that an end is not received. Therefore, there can be assuming that an end portion is lost and initializing transfer of the subsequent PDU (e.g., after a threshold of time passes) at action 812 if check 810 determines too long of time takes place. According to one embodiment, the assumption can be based upon time analysis, artificial intelligence techniques, a supplemental communication, or a combination thereof. If too long of time has not passed, then the methodology 800 can return to check 806 to determine if an end is found.

With a determined end (e.g., recognized, assumed, etc.) there can be categorizing a priority level of at least one subsequent PDU at act 814, commonly ranking potential PDUs based on priority. It is possible that PDUs have matching priority, so a check 816 can occur to determine if there is equal priority PDUs. If there are equal priority PDUs, then there can be rectifying the subsequent PDU to transfer after the end of transfer for the initial PDU from a group of subsequent PDUs at action 818; the group of subsequent PDUs can have about equal priority levels. In an illustrative example, if there are PDUs with about equal priority levels, then PDUs transferred first in time can be designated for processing.

With a functional order, there can be selecting a categorized subsequent PDU to transfer upon recognizing the end of transfer for the initial PDU at action 820. According to one embodiment, the selection of the subsequent PDU is a function of priority level of the subsequent PDU. If the selected unit is not in local storage there can be engaging in communication with a device that sends the subsequent PDU. The engaged communication can inform the device on status of the subsequent PDU and initializing transfer of the subsequent protocol data unit. Block 822 can represent engaging communication as well as initializing transfer.

Now referring to FIG. 9, an example methodology 900 is disclosed for limiting transmission of PDUs to alleviate congestion upon a receiver. At block 902, there can be identifying that an initial PDU is transmitted. Metadata related to the PDU can be ascertained, such as why the PDU was transmitted, a priority level of the transmitted PDU, and the like.

A communication channel can be analyzed and based on the analysis a determination of bandwidth size for the communication cannel can occur at act 904. A check 906 can be performed to determine if a size of the initial PDU is larger than (e.g., larger than, larger than or equal to, etc.) the determined bandwidth. If the size is larger than the determined bandwidth, then act 908 can be performed for dividing the initial protocol data unit into at least two portions, the at least two portions can fit within the bandwidth. Either a full packet or a divided packet can be transmitted at action 910. When transmitting the initial PDU after division, transmission can occur in sequential order.

While transmitting the initial PDU, there can be suppressing transmission of a subsequent PDU until completion of transmission of the initial PDU at event 912. A continuous check can occur that assists in determining completion of transmission of the initial PDU through act 914. With a completed transmission, there can be ordering at least two PDUs as a function of priority, the initial PDU is of higher priority than the subsequent PDU at event 916.

It will be appreciated that, in accordance with one or more aspects described herein, inferences can be made regarding PDU transfer should be employed, determining a wakeup period parameter, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to communication and/or processing of a PDU. By way of further illustration, an inference can be made related to selecting a number of physical frames as a wakeup period parameter based upon intended application, desired power savings, etc. It will be appreciated that the foregoing examples are illustrative in nature and are not intended to limit the number of inferences that can be made or the manner in which such inferences are made in conjunction with the various embodiments and/or methods described herein.

Figure 10:
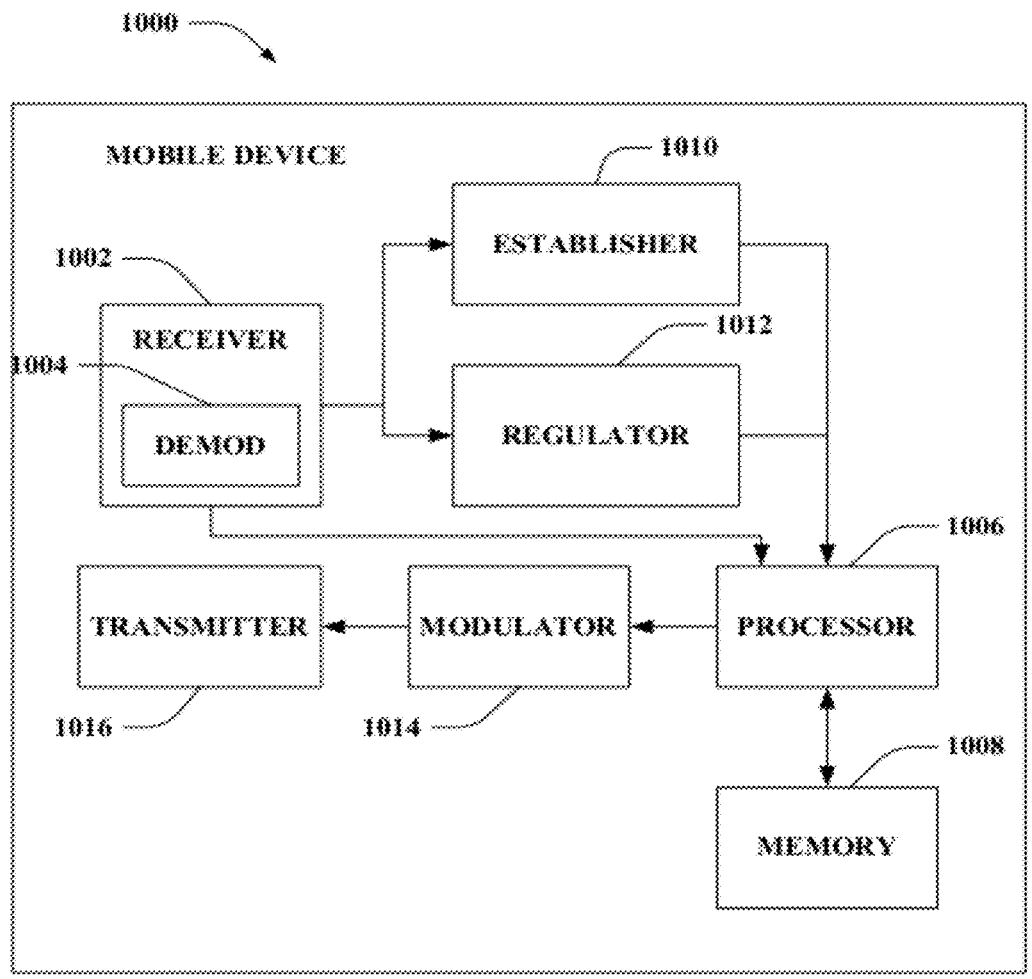
FIG. 10 is an illustration of an example mobile device that facilitates processing of protocol data units associated with priority levels in accordance with various aspects set forth herein.

FIG. 10 is an illustration of a mobile device 1000 (e.g., the mobile device 116 and/or 122 of FIG. 1) that facilitates processing of a PDU. Mobile device 1000 comprises a receiver 1002 that receives a signal from, for instance, a receive antenna (not shown), and performs typical actions thereon (e.g., filters, amplifies, downconverts, etc.) the received signal and digitizes the conditioned signal to obtain samples. Receiver 1002 can be, for example, an MMSE receiver, and can comprise a demodulator 1004 that can demodulate received symbols and provide them to a processor 1006 for channel estimation. Processor 1006 can be a processor dedicated to analyzing information received by receiver 1002 and/or generating information for transmission by a transmitter 1016, a processor that controls one or more components of mobile device 1000, and/or a processor that both analyzes information received by receiver 1002, generates information for transmission by transmitter 1016, and controls one or more components of mobile device 1000. It is to be appreciated that the transmitter 1016 and the receiver 1002 can match the transmitter 202 of FIG. 2 and the receiver 204 of FIG. 2; however, they can also be separate and distinct entities.

Mobile device 1000 can additionally comprise memory 1008 that is operatively coupled to processor 1006 and that can store data to be transmitted, received data, information related to available channels, data associated with analyzed signal and/or interference strength, information related to an assigned channel, power, rate, or the like, and any other suitable information for estimating a channel and communicating via the channel. Memory 1008 can additionally store protocols and/or algorithms associated with estimating and/or utilizing a channel (e.g., performance based, capacity based, etc.).

It will be appreciated that the data store (e.g., memory 1008) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1008 of the subject systems and methods is intended to comprise, without being limited to, these and any other suitable types of memory.

Processor 1002 cab be further operatively coupled an establisher 1010 and/or a regulator 1012. The establisher 1010 can identify a start of transfer for an initial PDU, such as through recognizing a start portion. As other units attempt to send PDUs before completion of the initial PDU the regulator 1012 can deny transfer of at least one subsequent PDU until collection of an end portion for the initial PDU. Mobile device 1000 still further comprises a modulator 1014 and the transmitter 1016 that transmits a signal (e.g., base CQI and differential CQI) to, for instance, a base station, another mobile device, etc. Although depicted as being separate from the processor 1006, it is to be appreciated that recognizer 1010 and/or aggregator 1012 can be part of processor 1006 or a number of processors (not shown).

Figure 11:
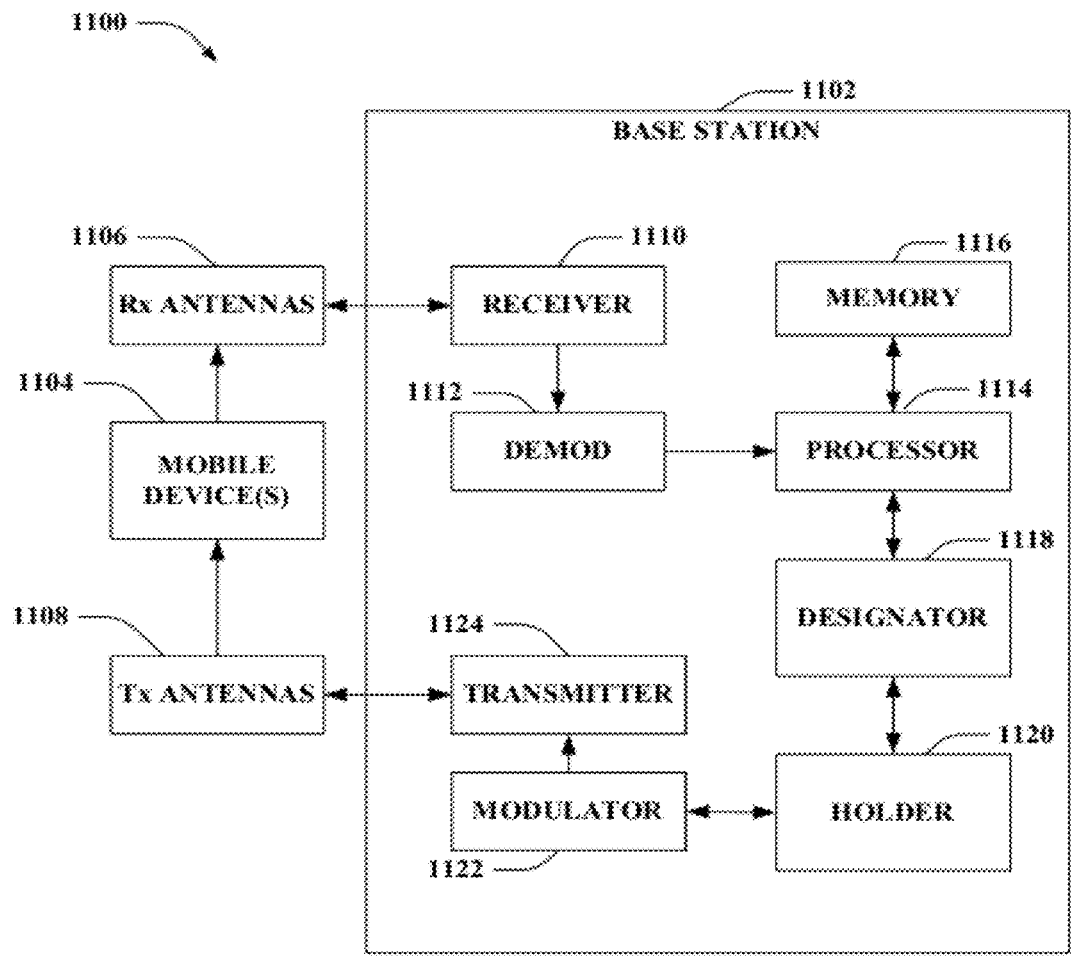
FIG. 11 is an illustration of an example system that facilitates communication of a protocol data unit in accordance with various aspects set forth herein.

FIG. 11 is an illustration of a system 1100 that facilitates communication of a PDU. System 1100 comprises a base station 1102 (e.g., access point, . . . ) with a receiver 1110 that receives signal(s) from one or more mobile devices 1104 (e.g., the mobile device 116 and/or 122 of FIG. 1) through a plurality of receive antennas 1106, and a transmitter 1122 that transmits to the one or more mobile devices 1104 through a plurality of transmit antennas 1108; the base station 1102 can be the base station 102 of FIG. 1. Receiver 1110 can receive information from receive antennas 1106 and is operatively associated with a demodulator 1112 that demodulates received information. Demodulated symbols are analyzed by a processor 1114 that can be similar to the processor described above with regard to FIG. 10, and which is coupled to a memory 1116 that stores information related to estimating a signal (e.g., pilot) strength and/or interference strength, data to be transmitted to or received from mobile device(s) 1104 (or a disparate base station (not shown)), and/or any other suitable information related to performing the various actions and functions set forth herein.

Processor 1114 is further coupled to a designator 1118 and/or a holder 1120. The designator 1118 can identify that an initial protocol data unit is transmitted, commonly from the system 1100. The holder 1120 can suppresses transmission of a subsequent data protocol unit until completion of transmission of the initial protocol data unit. Although depicted as being separate from the processor 1114, it is to be appreciated that confirmer 1118 and/or constructer 1120 can be part of processor 1114 or a number of processors (not shown).

Figure 12:
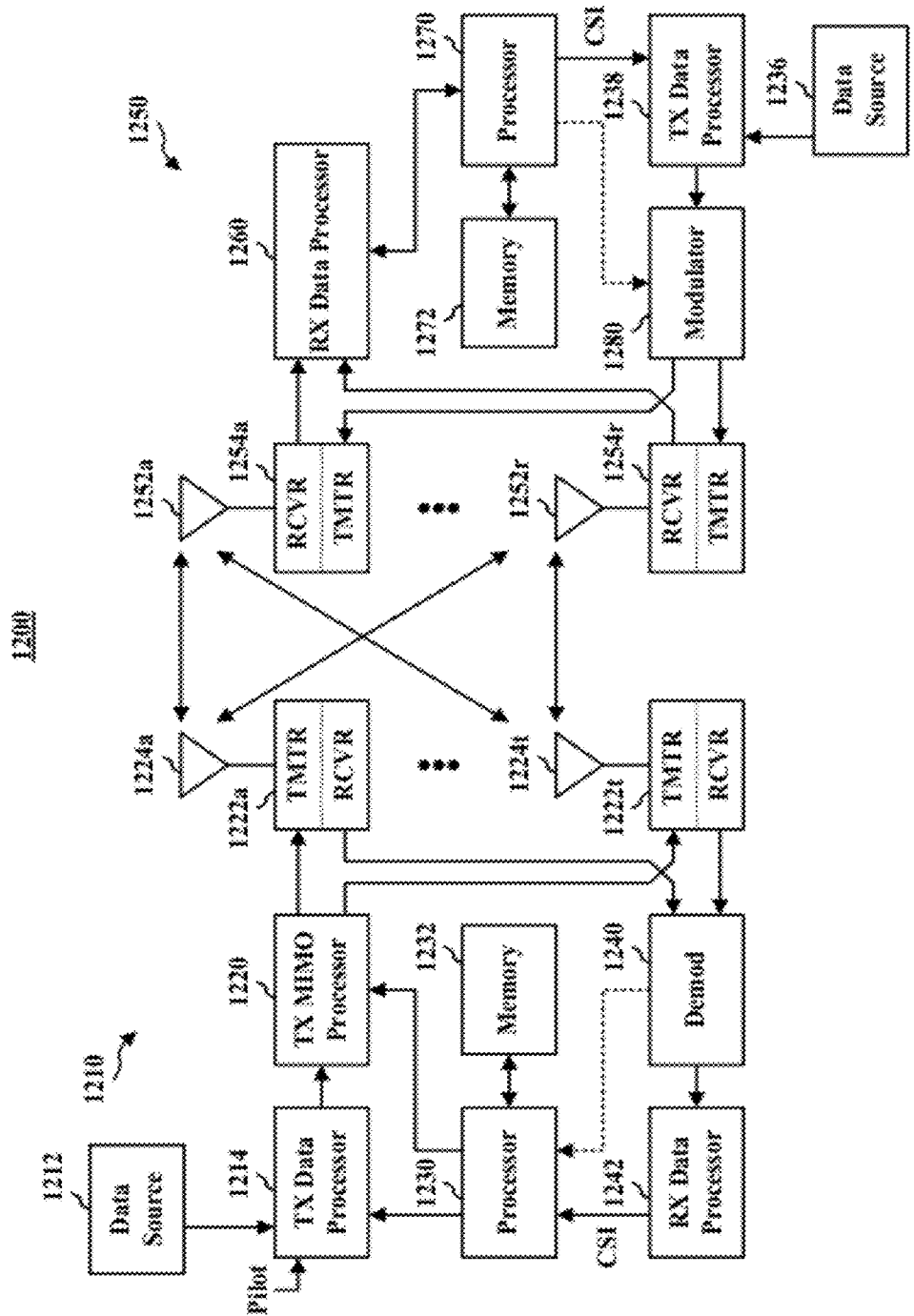
FIG. 12 is an illustration of an example wireless network environment that can be employed in conjunction with the various systems and methods described herein.

FIG. 12 shows an example wireless communication system 1200. The wireless communication system 1200 depicts one base station 1210 and one mobile device 1250 for sake of brevity. However, it is to be appreciated that system 1200 can include more than one base station and/or more than one mobile device, wherein additional base stations and/or mobile devices can be substantially similar or different from example base station 1210 and mobile device 1250 described below. In addition, it is to be appreciated that base station 1210 and/or mobile device 1250 can employ the systems (FIGS. 1-7 and 10-12) and/or methods (FIGS. 8-9) described herein to facilitate wireless communication there between.

At base station 1210, traffic data for a number of data streams is provided from a data source 1212 to a transmit (TX) data processor 1214. According to an example, each data stream can be transmitted over a respective antenna. TX data processor 1214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1230.

The modulation symbols for the data streams can be provided to a TX MIMO processor 1220, which can further process the modulation symbols (e.g., for OFDM). TX MIMO processor 1220 then provides $N_T$ modulation symbol streams to $N_T$ transmitters (TMTR) 1222a through 1222t. In various embodiments, TX MIMO processor 1220 applies beamforming weights to the symbols of the data streams and to the antenna from which the symbol is being transmitted.

Each transmitter 1222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1222a through 1222t are transmitted from $N_T$ antennas 1224a through 1224t, respectively.

At mobile device 1250 (e.g., the mobile device 116 and/or 122 of FIG. 1), the transmitted modulated signals are received by $N_R$ antennas 1252a through 1252r and the received signal from each antenna 1252 is provided to a respective receiver (RCVR) 1254a through 1254r. Each receiver 1254 conditions (e.g., filters, amplifies, and downconverts) a respective signal, digitizes the conditioned signal to provide samples, and further processes the samples to provide a corresponding "received" symbol stream.

An RX data processor 1260 can receive and process the $N_R$ received symbol streams from $N_R$ receivers 1254 based on a particular receiver processing technique to provide $N_T$ "detected" symbol streams. RX data processor 1260 can demodulate, deinterleave, and decode each detected symbol stream to recover the traffic data for the data stream. The processing by RX data processor 1260 is complementary to that performed by TX MIMO processor 1220 and TX data processor 1214 at base station 1210.

A processor 1270 can periodically determine which precoding matrix to utilize as discussed above. Further, processor 1270 can formulate a reverse link message comprising a matrix index portion and a rank value portion.

The reverse link message can comprise various types of information regarding the communication link and/or the received data stream. The reverse link message can be processed by a TX data processor 1238, which also receives traffic data for a number of data streams from a data source 1236, modulated by a modulator 1280, conditioned by transmitters 1254a through 1254r, and transmitted back to base station 1210.

At base station 1210, the modulated signals from mobile device 1250 are received by antennas 1224, conditioned by receivers 1222, demodulated by a demodulator 1240, and processed by a RX data processor 1242 to extract the reverse link message transmitted by mobile device 1250. Further, processor 1230 can process the extracted message to determine which precoding matrix to use for determining the beamforming weights.

Processors 1230 and 1270 can direct (e.g., control, coordinate, manage, etc.) operation at base station 1210 and mobile device 1250, respectively. Respective processors 1230 and 1270 can be associated with memory 1232 and 1272 that store program codes and data. Processors 1230 and 1270 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 13:
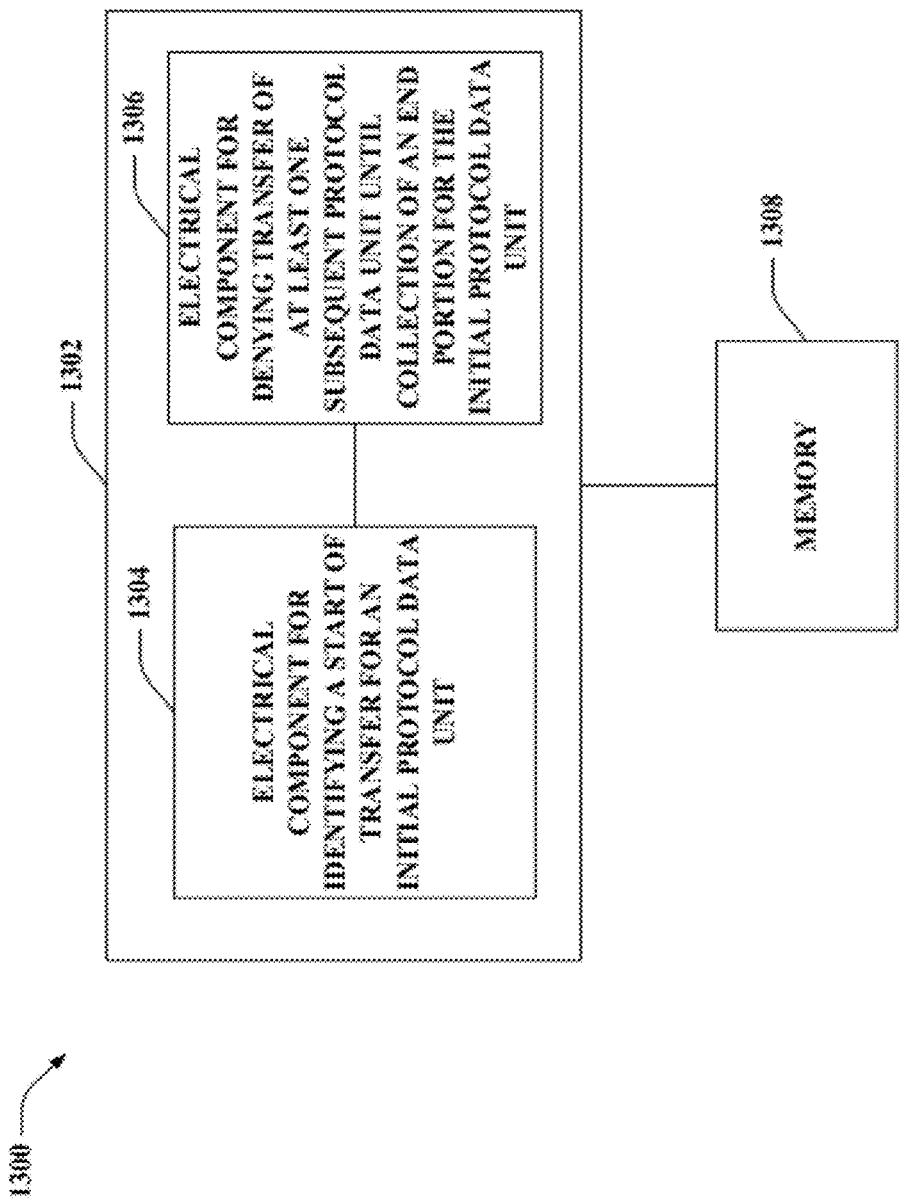
FIG. 13 is an illustration of an example system that facilitates processing of different protocol data units in accordance with various aspects set forth herein.

With reference to FIG. 13, illustrated is a system 1300 that effectuates managing of PDU collection. For example, system 1300 can reside at least partially within a mobile device. It is to be appreciated that system 1300 is represented as including functional blocks, which can be functional blocks that represent functions implemented by a processor, software, or combination thereof (e.g., firmware). System 1300 includes a logical grouping 1302 of electrical components that can act in conjunction. For instance, logical grouping 1302 can include an electrical component for identifying a start of transfer for an initial protocol data unit 1304. Moreover, the logical grouping 1302 can include an electrical component for denying transfer of at least one subsequent protocol data unit until collection of an end portion for the initial protocol data unit 1306.

The logical grouping 1302 can also include an electrical component for recognizing an end portion for the initial protocol data unit, an electrical component for initializing transfer of the subsequent protocol data unit, an electrical component for categorizing a priority level of at least one subsequent protocol data unit, an electrical component selecting a categorized subsequent protocol data unit to transfer upon recognizing the end of transfer for the initial protocol data unit, selection of the subsequent protocol data unit can be a function of priority level of the subsequent protocol data unit, an electrical component for rectifying the subsequent protocol data unit to transfer after the end of transfer for the initial protocol data unit from a group of subsequent protocol data units, the group of subsequent protocol data units can have about equal priority levels, an electrical component for assuming that an end portion is lost and initializing transfer of the of the subsequent protocol data unit, and/or an electrical component for engaging in communication with a device that sends the subsequent protocol data unit, the engaged communication can inform the device on status of the subsequent protocol data unit; these components can integrate as part of the electrical component for identifying a transmission of a control protocol data unit 1304 and/or the electrical component for incrementing a counter as a direct correlation of the identified transmission for the control protocol data unit 1306, as independent entities, and the like. Additionally, system 1300 can include a memory 1308 that retains instructions for executing functions associated with electrical components 1304 and 1306. While shown as being external to memory 1308, it is to be understood that one or more of electrical components 1304 and 1306 can exist within memory 1308.

Figure 14:
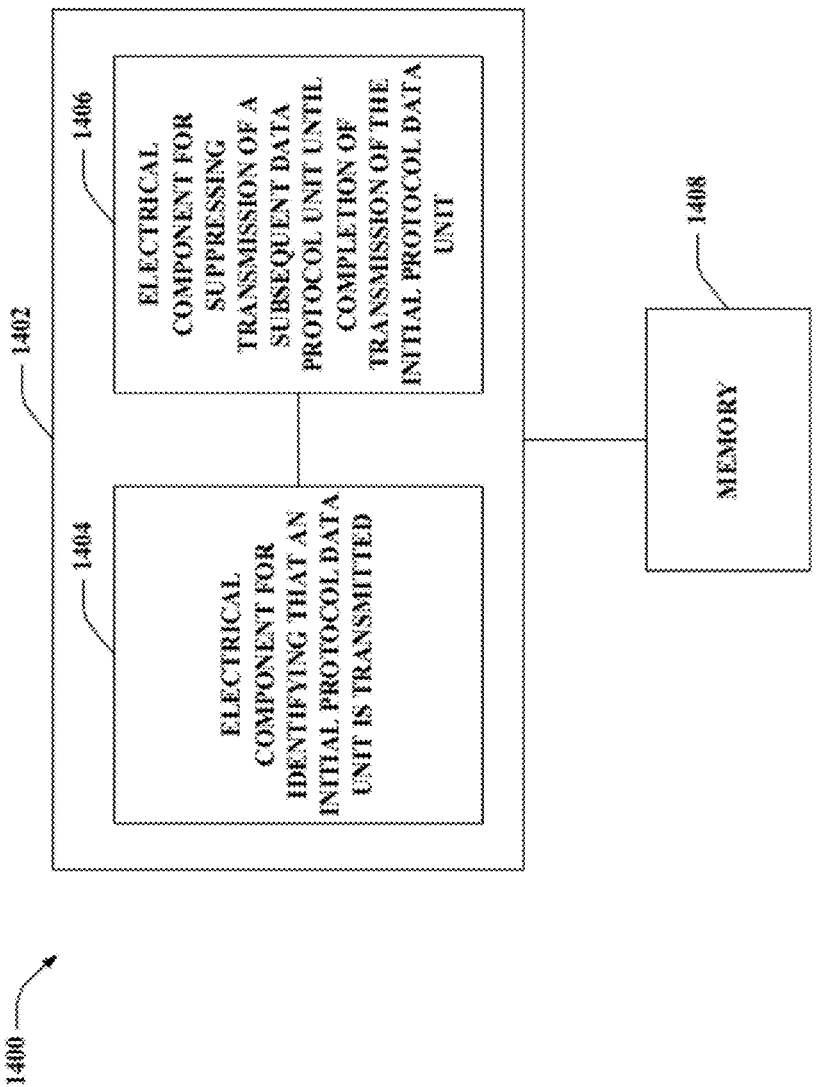
FIG. 14 is an illustration of an example system that facilitates regulating communication of protocol data units in accordance with various aspects set forth herein.

Turning to FIG. 14, illustrated is a system 1400 that effectuates regulating transmission of a PDU. For example, system 1400 can reside at least partially within a mobile device. It is to be appreciated that system 1400 is represented as including functional blocks, which can be functional blocks that represent functions implemented by a processor, software, or combination thereof (e.g., firmware). System 1400 includes a logical grouping 1402 of electrical components that can act in conjunction. For instance, logical grouping 1402 can include an electrical component for identifying that an initial protocol data unit is transmitted 1404. Moreover, the logical grouping 1402 can include an electrical component for suppressing transmission of a subsequent data protocol unit until completion of transmission of the initial protocol data unit 1406.

The logical grouping 1402 can also include an electrical component for determining a bandwidth size of a communication cannel, an electrical component for determining if a size of the initial protocol data unit is larger than the determined bandwidth, an electrical component for dividing the initial protocol data unit into at least two portions, the at least two portions can fit within the bandwidth, an electrical component for transmitting the initial protocol data unit in sequential order, an electrical component for ordering at least two protocol data units as a function of priority, the initial protocol data unit is of higher priority than the subsequent protocol data unit, and/or an electrical component for determining completion of transmission of the initial protocol data unit.; these components can integrate as part of the electrical component for authenticating a control protocol data unit 1404 and/or the electrical component for producing a notice for a module that sends the control protocol data unit to reset a counter upon successful authentication of the control protocol data unit 1406, as independent entities, and the like.

While shown as being external to memory 1408, it is to be understood that electrical components 1404 and 1406 can exist within memory 1410.

What has been described above includes examples of one or more embodiments. It is, of course, not possible to describe every conceivable combination of components or methodologies for purposes of describing the aforementioned embodiments, but one of ordinary skill in the art can recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A method for managing protocol data unit communication in a wireless communication apparatus, the method comprising:
   identifying a start portion for an initial protocol data unit, wherein the initial protocol data unit is divided into a plurality of portions comprising the start portion and an end portion, and wherein the start portion includes information on how to reconstruct the plurality of portions; and
   until determining that the end portion for the initial protocol data unit has been collected, denying transfer of at least one subsequent protocol data unit; and
   ranking protocol data units of a group of protocol data units based on priority levels, wherein the subsequent protocol data unit is of a higher priority level than the initial protocol data unit.

2. The method of claim 1, wherein the subsequent protocol data unit is selected from the group of protocol data units, and wherein the selection is a function of a rank of the subsequent protocol data unit.

3. The method of claim 2, wherein the subsequent protocol data unit is selected from the group of protocol data units based in part on a time of transfer.

4. The method of claim 1, further comprising:
   engaging in communication with a device that sends the subsequent protocol data unit, wherein the communication informs the device on status of the subsequent protocol data unit.

5. A method for managing protocol data unit communication in a wireless communication apparatus, the method comprising:
   identifying a start portion for an initial protocol data unit, wherein the initial protocol data unit is divided into a plurality of portions comprising the start portion and an end portion, and wherein the start portion includes information on how to reconstruct the plurality of portions; and
   if ownership of the initial protocol data unit cannot be inferred except from a header of the initial protocol data unit and until determining that the end portion for the initial protocol data unit has been collected, denying transfer of at least one subsequent protocol data unit, wherein the subsequent protocol data unit is of a higher priority level than the initial protocol data unit.

6. The method of claim 5, wherein the subsequent protocol data unit is selected from the group of protocol data units, and wherein the selection is a function of a rank of the subsequent protocol data unit.

7. The method of claim 6, wherein the subsequent protocol data unit is selected from the group of protocol data units based in part on a time of transfer.

8. The method of claim 5, further comprising:
   engaging in communication with a device that sends the subsequent protocol data unit, wherein the communication informs the device on status of the subsequent protocol data unit.

9. A method for managing protocol data unit communication in a wireless communication apparatus, the method comprising:
   identifying a start portion for an initial protocol data unit, wherein the initial protocol data unit is divided into a plurality of portions comprising the start portion and an end portion, and wherein the start portion includes information on how to reconstruct the plurality of portions; and
   until determining that the end portion for the initial protocol data unit has been collected, denying transfer of at least one subsequent protocol data unit, wherein determining that the end portion for the initial protocol data unit has been collected comprises assuming that the end portion is lost, wherein the assuming is based upon time analysis, artificial intelligence techniques, a supplemental communication, or a combination thereof, and wherein the subsequent protocol data unit is of a higher priority level than the initial protocol data unit.

10. The method of claim 9, wherein the subsequent protocol data unit is selected from the group of protocol data units, and wherein the selection is a function of a rank of the subsequent protocol data unit.

11. The method of claim 10, wherein the subsequent protocol data unit is selected from the group of protocol data units based in part on a time of transfer.

12. The method of claim 9, further comprising:
   engaging in communication with a device that sends the subsequent protocol data unit, wherein the communication informs the device on status of the subsequent protocol data unit.

13. In a wireless communication system, a wireless communication apparatus comprising:
   a processor configured to:
      identify a start portion for an initial protocol data unit, wherein the initial protocol data unit is divided into a plurality of portions comprising the start portion and an end portion, and wherein the start portion includes information on how to reconstruct the plurality of portions;
      until determining that the end portion for the initial protocol data unit has been collected, deny transfer of at least one subsequent protocol data unit; and
      rank protocol data units of a group of protocol data units based on priority levels, wherein the subsequent protocol data unit is of a higher priority level than the initial protocol data unit.

14. The wireless communication apparatus of claim 13, wherein the processor is further configured to select the subsequent protocol data unit from the group of subsequent protocol data units, and wherein the selection is a function of a rank of the subsequent protocol data unit.

15. The wireless communication apparatus of claim 14, wherein the processor is further configured to select the subsequent protocol data unit from the group of subsequent protocol data unit based in part on a time of transfer.

16. The wireless communication apparatus of claim 13, wherein the processor is further configured to engage in communication with a device that sends the subsequent protocol data unit, the engaged communication informs the device on status of the subsequent protocol data unit.

17. In a wireless communication system, a wireless communication apparatus comprising:
a processor configured to:
identify a start portion for an initial protocol data unit, wherein the initial protocol data unit is divided into a plurality of portions comprising the start portion and an end portion, and wherein the start portion includes information on how to reconstruct the plurality of portions; and
if ownership of the initial protocol data unit cannot be inferred except from a header of the initial protocol data unit and until determining that the end portion for the initial protocol data unit has been collected, deny transfer of at least one subsequent protocol data unit; wherein the subsequent protocol data unit is of a higher priority level than the initial protocol data unit.

18. The wireless communication apparatus of claim 17, wherein the processor is further configured to select the subsequent protocol data unit from the group of subsequent protocol data units, and wherein the selection is a function of a rank of the subsequent protocol data unit.

19. The wireless communication apparatus of claim 18, wherein the processor is further configured to select the subsequent protocol data unit from the group of subsequent protocol data unit based in part on a time of transfer.

20. The wireless communication apparatus of claim 17, wherein the processor is further configured to engage in communication with a device that sends the subsequent protocol data unit, the engaged communication informs the device on status of the subsequent protocol data unit.

21. In a wireless communication system, a wireless communication apparatus comprising:
a processor configured to:
identify a start portion for an initial protocol data unit, wherein the initial protocol data unit is divided into a plurality of portions comprising the start portion and an end portion, and wherein the start portion includes information on how to reconstruct the plurality of portions; and
until determining that the end portion for the initial protocol data unit has been collected, deny transfer of at least one subsequent protocol data unit; wherein determining that the end portion for the initial protocol data unit has been collected comprises assuming that the end portion is lost, wherein the assuming is based upon time analysis, artificial intelligence techniques, a supplemental communication, or a combination thereof, and wherein the subsequent protocol data unit is of a higher priority level than the initial protocol data unit.

22. The wireless communication apparatus of claim 21, wherein the processor is further configured to select the subsequent protocol data unit from the group of subsequent protocol data units, and wherein the selection is a function of a rank of the subsequent protocol data unit.

23. The wireless communication apparatus of claim 22, wherein the processor is further configured to select the subsequent protocol data unit from the group of subsequent protocol data unit based in part on a time of transfer.

24. The wireless communication apparatus of claim 21, wherein the processor is further configured to engage in communication with a device that sends the subsequent protocol data unit, the engaged communication informs the device on status of the subsequent protocol data unit.

25. A method for managing protocol data unit communication in a wireless communication apparatus, the method comprising:
determining a bandwidth size of a communication channel;
determining if a size of an initial protocol data unit is larger than the determined bandwidth;
dividing the initial protocol data unit into a plurality of portions, wherein the plurality of portions can fit within the bandwidth, wherein the plurality of portions comprises at least a start portion and an end portion, and wherein the start portion includes information on how to reconstruct the plurality of portions;
transmitting the plurality of portions of the initial protocol data unit in sequential order;
identifying that a start portion for the initial protocol data unit is transmitted; and
suppressing transmission of a subsequent protocol data unit until determining an end portion for the initial protocol data unit has been collected, wherein the subsequent protocol data unit is of a higher priority level than the initial protocol data unit.

26. The method of claim 25, further comprising:
ordering a plurality of protocol data units as a function of priority.

27. A method for managing protocol data unit communication in a wireless communication apparatus, the method comprising:
ordering a plurality of protocol data units as a function of priority, wherein the plurality of protocol data units comprises at least an initial protocol data unit and a subsequent protocol data unit, wherein the subsequent protocol data unit is of a higher priority level than the initial protocol data unit, wherein the initial protocol data unit is divided into a plurality of portions comprising a start portion and an end portion, and wherein the start portion includes information on how to reconstruct the plurality of portions;
identifying that the start portion for the initial protocol data unit is transmitted; and
suppressing transmission of the subsequent protocol data unit until determining that the end portion for the initial protocol data unit has been collected.

28. The method of claim 27, further comprising:
determining a bandwidth size of a communication channel;
determining if a size of the initial protocol data unit is larger than the determined bandwidth;
dividing the initial protocol data unit into a plurality of portions, wherein the plurality of portions fit within the bandwidth; and
transmitting the plurality of portions of the initial protocol data unit in sequential order.

29. In a wireless communication system, a wireless communication apparatus comprising:
a processor configured to:
determine a bandwidth size of a communication channel;
determine if a size of the initial protocol data unit is larger than the determined bandwidth;
in response to the size of the initial protocol data unit being larger than the determined bandwidth, divide the initial protocol data unit into a plurality of portions, wherein the plurality of portions can fit within the bandwidth, wherein the plurality of portions comprises a start portion and an end portion, and wherein the start portion includes information on how to reconstruct the plurality of portions;

transmit the plurality of portions of the initial protocol data unit in sequential order;

identify that a start portion for an initial protocol data unit is transmitted; and suppress transmission of a subsequent protocol data unit until determining the end portion for the initial protocol data unit has been collected, wherein the subsequent protocol data unit is of a higher priority level than the initial protocol data unit.

30. The wireless communication apparatus of claim 29, wherein the processor is further configured to order the plurality of protocol data units as a function of priority, and wherein the initial protocol data unit is of higher priority than the subsequent protocol data unit.

31. In a wireless communication system, a wireless communication apparatus comprising:

a processor configured to:

order a plurality of protocol data units as a function of priority, wherein the plurality of protocol data units comprises at least an initial protocol data unit and a subsequent protocol data unit, wherein the initial protocol data unit is of higher priority than the subsequent data unit, wherein the initial protocol data unit is divided into a plurality of portions comprising a start portion and an end portion, and wherein the start portion includes information on how to reconstruct the plurality of portions;

identify that the start portion for the initial protocol data unit is transmitted; and suppress transmission of the subsequent protocol data unit until determining that the end portion for the initial protocol data unit has been collected.

32. The wireless communication apparatus of claim 31, wherein the processor is further configured to:

determine a bandwidth size of a communication channel;

determine if a size of the initial protocol data unit is larger than the determined bandwidth;

in response to the size of the initial protocol data unit being larger than the determined bandwidth, divide the initial protocol data unit into a plurality of portions, such that the plurality of portions can fit within the bandwidth; and transmit the plurality of portions of the initial protocol data unit in sequential order.

* * * * *